(12) United States Patent
Wong et al.

(10) Patent No.: US 12,475,329 B2
(45) Date of Patent: Nov. 18, 2025

(54) NATURAL LANGUAGE TRANSLATION MODEL TRAINING AND DEPLOYMENT

(71) Applicant: Logistics and Supply Chain MultiTech R&D Centre Limited, Pok Fu Lam (HK)

(72) Inventors: Kwong Yeung Simon Wong, Pok Fu Lam (HK); Chun On Wong, Pok Fu Lam (HK); Chin Chiu Chung, Pok Fu Lam (KR); Sze Man Tong, Pok Fu Lam (HK); Chi Hung Tong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 459 days.

(21) Appl. No.: 17/709,793

(22) Filed: Mar. 31, 2022

(65) Prior Publication Data

US 2023/0316004 A1  Oct. 5, 2023

(51) Int. Cl.
*G06F 17/00* (2019.01)
*G06F 40/44* (2020.01)
*G06F 40/51* (2020.01)

(52) U.S. Cl.
CPC .............. *G06F 40/51* (2020.01); *G06F 40/44* (2020.01)

(58) Field of Classification Search
CPC ........ G06F 40/10; G06F 40/40; G06F 40/103; G06F 40/51; G06F 40/58; G06F 40/42;
(Continued)

(56) References Cited

U.S. PATENT DOCUMENTS 8,296,127 B2 * 10/2012 Marcu ................. G06F 40/42
704/4
11,847,303 B1 * 12/2023 Bodell .............. G06Q 30/0281
(Continued)

FOREIGN PATENT DOCUMENTS

| CN | 111709249 A | * | 9/2020 | ........... G06F 16/355 |
| CN | 113609873 A | * | 11/2021 | |
| CN | 114492469 A | * | 5/2022 | |

OTHER PUBLICATIONS

Moslem, Yasmin, et al. "Domain-specific text generation for machine translation." arXiv preprint arXiv:2208.05909 (2022). (Year: 2022).*

*Primary Examiner* — Michael Ortiz-Sanchez
(74) *Attorney, Agent, or Firm* — Renner, Kenner, Greive, Bobak, Taylor & Weber

(57) ABSTRACT

A computer-implemented method for training a natural language translation model. The computer-implemented method includes: processing one or more sets of electronic parallel documents to obtain a plurality of aligned parallel sentences; creating a first training set including a subset of the plurality of aligned parallel sentences; and training the natural language translation model in a first stage using the first training set. The computer-implemented method further includes: modifying the first training set based on translation errors detected after the first stage of training; creating a second training set based on the modified first training set and at least some of the plurality of aligned parallel sentences not in the first training set; and training the natural language translation model in a second stage using the second training set so as to improve translation performance of the natural language translation model.

22 Claims, 6 Drawing Sheets

(58) Field of Classification Search
CPC ........ G06F 40/205; G06F 40/45; G06F 40/47; G06F 16/951; G06F 16/215; G06F 16/254; G06F 40/20; G06F 40/30; G06F 40/44; G06F 40/263; G06F 11/263; G06F 16/30; G06F 16/31; G06F 16/285; G06F 18/24; G06F 11/3692; G06F 11/3688; G06N 3/044; G06N 3/0455; G06N 20/00; G06N 3/09; G06N 3/042; G06N 5/022; G06N 3/08; G06N 5/01; G06N 5/025

See application file for complete search history.

(56) References Cited

U.S. PATENT DOCUMENTS

| | | | |
|---|---|---|---|
| 2015/0286629 A1* | 10/2015 | Abdel-Reheem | G06F 40/295 704/9 |
| 2019/0087417 A1* | 3/2019 | Wang | G06F 40/44 |
| 2020/0117715 A1* | 4/2020 | Lee | G06N 3/08 |
| 2020/0210772 A1* | 7/2020 | Bojar | G06F 18/2148 |
| 2022/0198159 A1* | 6/2022 | Dvorkovich | G06F 40/58 |

* cited by examiner

NATURAL LANGUAGE TRANSLATION MODEL TRAINING AND DEPLOYMENT

TECHNICAL FIELD

The invention relates to training of artificial intelligence based natural language translation model and a natural language translation model.

BACKGROUND

Natural language processing refers to the processing (e.g., translation) of language by computers, and it typically involves artificial intelligence based techniques.

SUMMARY OF THE INVENTION

In a first aspect, there is provided a computer-implemented method for training a natural language translation model. The computer-implemented method comprises: processing one or more sets of electronic parallel documents to obtain a plurality of aligned parallel sentences; creating a first training set comprising a subset of the plurality of aligned parallel sentences; training the natural language translation model in a first stage using the first training set; modifying the first training set based on translation errors detected after the first stage of training; creating a second training set based on the modified first training set and at least some of the plurality of aligned parallel sentences not in the first training set; and training the natural language translation model in a second stage using the second training set so as to improve translation performance of the natural language translation model.

"Electronic parallel documents" are parallel documents in electronic form, and "parallel documents" are documents that are translation, preferably formal and recognized translation, of one another. The documents may relate to translation of two languages (one is the translation of another) or translation of more than two languages (each is a translation of the other). In one example a set of parallel document may include an English language document and a correspondingly-translated version of the document in Spanish language.

Optionally, the processing of one or more sets of electronic parallel documents comprises: processing the one or more sets of electronic parallel documents to obtain a plurality of parallel sentences; and performing an alignment operation to align the plurality of parallel sentences so as to form the plurality of aligned parallel sentences.

The alignment operation is arranged to align the plurality of parallel sentences such that a sentence in the first natural language is aligned with (i.e., correspond to, or matched with) a corresponding translation of the sentence in the second natural language. The alignment operation does not necessarily involve spatial aligning the text.

Optionally, the processing of the one or more sets of electronic parallel documents comprises: if the one or more sets of electronic parallel documents are not in a form of text files, converting the one or more sets of electronic parallel documents into text files, preferably plain text files; and processing the text files or plain text files to obtain the plurality of parallel sentences.

Optionally, the processing of the one or more sets of electronic parallel documents comprises: performing a cleaning operation to clean the plurality of parallel sentences or the plurality of aligned parallel sentences.

Optionally, processing the text files comprises: performing a cleaning operation to clean the plurality of parallel sentences or the plurality of aligned parallel sentences.

Optionally, the cleaning operation comprises removing some text and/or punctuations from the plurality of parallel sentences or the plurality of aligned parallel sentences.

Optionally, the translation errors comprise one or more of: grammatical error, punctuation error, inconsistent use of terminology, faulty sentence structure, wrong word order, untranslated word, mistranslated word, improper repetition of word, phrase, statement, or article, wrong use of word, and literal translation out of context.

Optionally, the modifying of the first training set based on translation errors comprises: removing and/or editing some text and/or punctuations in the subset of the plurality of aligned parallel sentences.

Optionally, the computer-implemented method further comprises: modifying the second training set based on translation errors detected after the second stage of training; creating a third training set based on the modified second training set and at least some of the plurality of aligned parallel sentences not in the first and second training sets; and training the natural language translation model in a third stage using the third training set so as to further improve translation performance of the natural language translation model. In some embodiments, these modifying, creating, and training steps can be repeated for the third and one or more further training sets to further improve translation performance of the natural language translation model.

Optionally, the natural language translation model comprises a neural-machine translation model or network.

Optionally, the natural language translation model is arranged for translation from a first natural language to a second natural language. Optionally, each of the one or more sets of electronic parallel documents are in the first natural language and the second natural language. Optionally, each of the plurality of aligned parallel sentences are in the first natural language and the second natural language.

Optionally, the natural language translation model is arranged for translation between the first natural language and the second natural language.

Optionally, the first natural language is English language and the second natural language is Spanish language.

Optionally, each of the plurality of aligned parallel sentences of the first training set contains 8 to 50 words. Optionally, each of the plurality of aligned parallel sentences of the second training set contains 8 to 50 words. Optionally, each of the plurality of aligned parallel sentences of the third training set contains 8 to 50 words.

Optionally, the number of aligned parallel sentences used in the training in the second stage is more than the number of aligned parallel sentences used in the training in the first stage. Optionally, the number of aligned parallel sentences used in the training in the third stage is more than the number of aligned parallel sentences used in the training in the second stage.

Optionally, the one or more sets of electronic parallel documents comprise electronic documents of the same field or context, and the natural language translation model is a field or context specific natural language translation model.

Optionally, the field or context is a legal field or legal context. Legal field or legal context may relate to arbitration, mediation, trade, dispute resolution, etc.

Optionally, the computer-implemented method further comprises: collecting, e.g., retrieving, the one or more sets of electronic parallel documents from one or more databases.

In a second aspect, there is provided a natural language translation model trained using or obtained from the computer-implemented method of the first aspect. Preferably, the translation model is arranged for translation from a first natural language (e.g., English) to a second natural language (e.g., Spanish), and is specifically arranged to translate text in legal field or legal context.

In a third aspect, there is provided a computer program or computer program product comprising the natural language translation model of the second aspect.

In a fourth aspect, there is provided a non-transitory computer-readable medium comprising the natural language translation model of the second aspect.

In a fifth aspect, there is provided a computer-implemented method of natural language translation, comprising: receiving text in a first language (or source language); processing the received text using the natural language translation model of the second aspect; and outputting text in a second language (or target language) based on the processing, the text in the second language being a translation of the text in the first language.

The computer-implemented method may further include receiving an electronic file containing the text in the first language, and extracting the text in the first language from the electronic file. The computer-implemented method may further include displaying the text in the first language and the text in the second language, e.g., side-by-side. The computer-implemented method may further include providing an electronic file containing the text in the second language for download, transfer, and/or view.

In a sixth aspect, there is provided an electronic system, comprising one or more processors arranged to: receive text in a first language (or source language); process the received text using the natural language translation model of the second aspect; and output text in a second language (or target language) based on the processing, the text in the second language being a translation of the text in the first language.

The electronic system may further include input means for receiving an electronic file containing the text in the first language, and means (e.g., one or more processors) for extracting the text in the first language from the electronic file. The electronic system may further include a display operably connected with the one or more processors for displaying the text in the first language and the text in the second language. The electronic system may further include output means for providing an electronic file containing the text in the second language for download, transfer, and/or view.

Optionally, the electronic system is an online session system, such as an online dispute resolution system. In some embodiments, the online dispute resolution system is an arbitration or mediation system that facilitates online arbitration or mediation. The system may be implemented on a single computer or a cloud computing system or network. The system may be implemented as a web service.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 1:
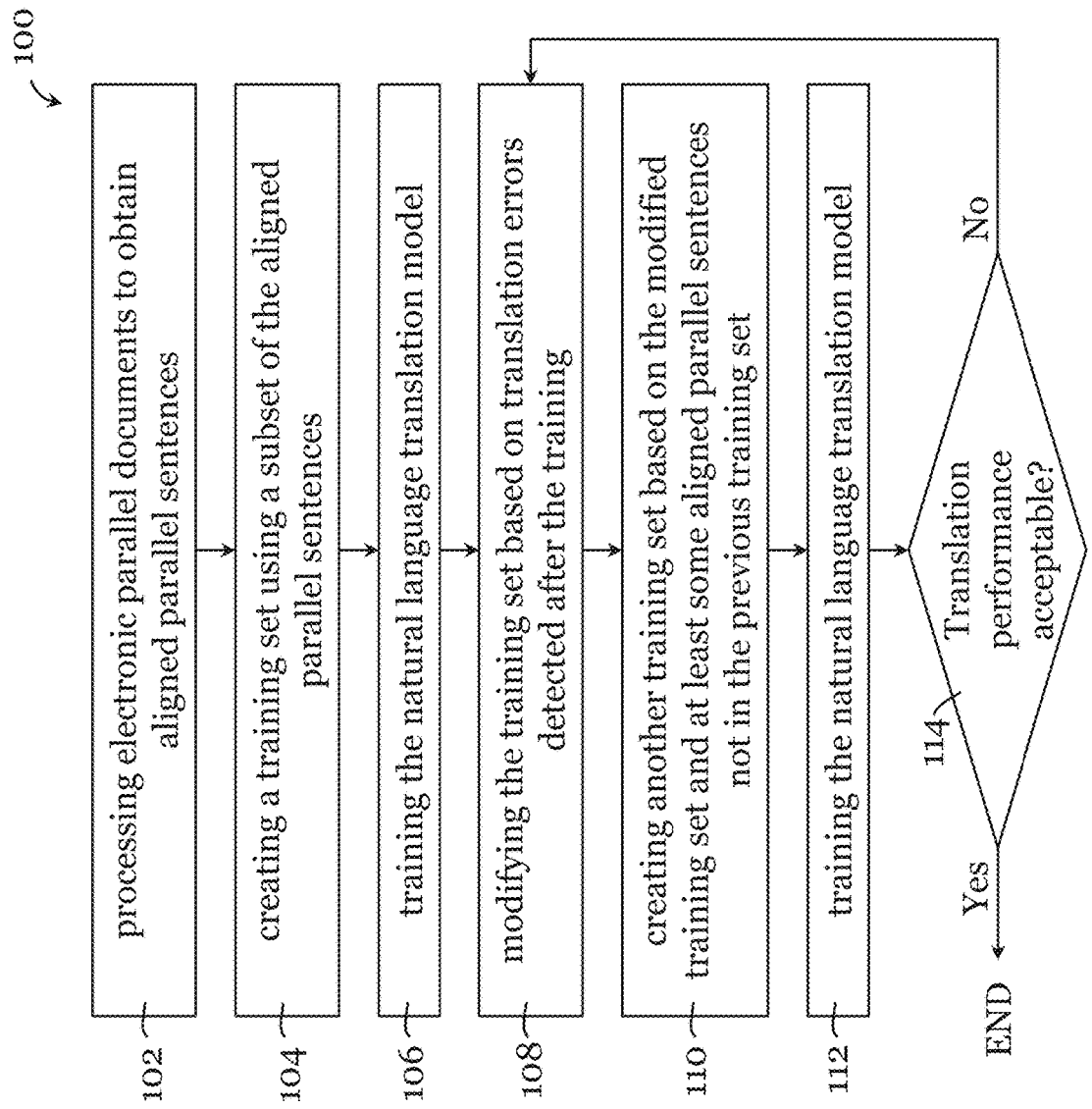
FIG. 1 is a flowchart illustrating a computer-implemented method for training a natural language translation model in one embodiment of the invention.

FIG. 1 shows a method 100 for training a natural language translation model in one embodiment of the invention. In this embodiment, the natural language translation model comprises a neural-machine translation model or network, and is arranged to translate from a source language to a target language.

The method too begins with step 102, in which electronic parallel documents are processed to obtain aligned parallel sentences. The electronic parallel documents are parallel documents (i.e., documents that are translation, preferably formal and recognized translation, of one another) in electronic form. The electronic parallel documents may be obtained from reliable sources or databases for quality control. The electronic parallel documents are preferably documents in the same area, field, or context (e.g., legal) such that the natural language translation model may be specifically adapted for translating a particular area, field (legal), or context or closely related areas, fields, or contexts. The processing of the electronic parallel documents to obtain aligned parallel sentences may involve manual (requires user intervention) or automatic (does not require user intervention) processing. For example, the processing of the electronic documents may involve manipulating (e.g., editing) text in the electronic parallel documents. The aligned parallel sentences include sentences in the first natural language aligned with (i.e., correspond to, or matched with) a corresponding translation of the sentences in the second natural language. In some examples, over 10,000, over 20,000, or over 50,000 pairs of aligned parallel sentences are obtained from step 102. Each of the aligned parallel sentences may be formed by 8 to 50 words in one example and other number of words in other examples.

After obtaining the aligned parallel sentences in step 102, in step 104, some of the aligned parallel sentences (a subset of the aligned parallel sentences) obtained in step 102 are used to form a training set to be used for training the natural language translation model. Then, in step 106, the selected subset of aligned parallel sentences, or the training set, are provided and used to train the natural language translation model.

After the training in step 106, the training performance or translation performance of the model is assessed. The assessment may involve detection of translation errors.

These translation errors may include, e.g., grammatical error, punctuation error, inconsistent use of terminology, faulty sentence structure, wrong word order, untranslated word, mistranslated word, improper repetition of word, phrase, statement, or article, wrong use of word, and literal translation out of context, in respect of the target language. These errors may be identified manually by a user and/or automatically by a computer program or application.

In step 108, based on the translation errors identified after the training in step 106, the training set is modified to address these errors. For example, the modification of the training set may include removing and/or editing some text and/or punctuations in one or more of the aligned parallel sentences of the training set. These modifications may be identified manually by a user and/or automatically by a computer program or application.

After modifying the training set in step 108, in step 110, another training set is created using the modified training set as well as some aligned parallel sentences not in the previous training set. These aligned parallel sentences not in the previous training set may be those obtained from step toe and not used in step 104. As such this another training set has more number of aligned parallel sentences than the previous training set.

In step 112, the training set obtained from step 110 is provided and used to further train the natural language translation model. It is believed that this processing arrangement improves translation performance (e.g., reduces translation errors) of the natural language translation model.

After step 112, in step 114, the method too determines whether the translation performance of the natural language translation model trained in step 112 is acceptable. The determination may include assessing the training performance or translation performance of the model, like in step 106. The assessment may involve detection of translation errors and the translation performance of the natural language translation model is determined to be acceptable if the translation errors is below a threshold (or if there is no detected translation errors).

If, in step 114, it is determined that the translation performance of the natural language translation model trained in step 112 is acceptable, then the method too ends.

If, in step 114, it is determined that the translation performance of the natural language translation model trained in step 112 is not acceptable, then the method too cycles back to step 108, in which the training set (the set used to train the model in step 112) is further modified based on the above described operation of step 108, and proceeds to step 110 to 114. The process repeats until in step 114 the translation performance of the natural language translation model is determined to be acceptable. As further training set(s) are produced, the number of aligned parallel sentences in each further set is more than the number of aligned parallel sentences in the previous set.

Figure 2A:
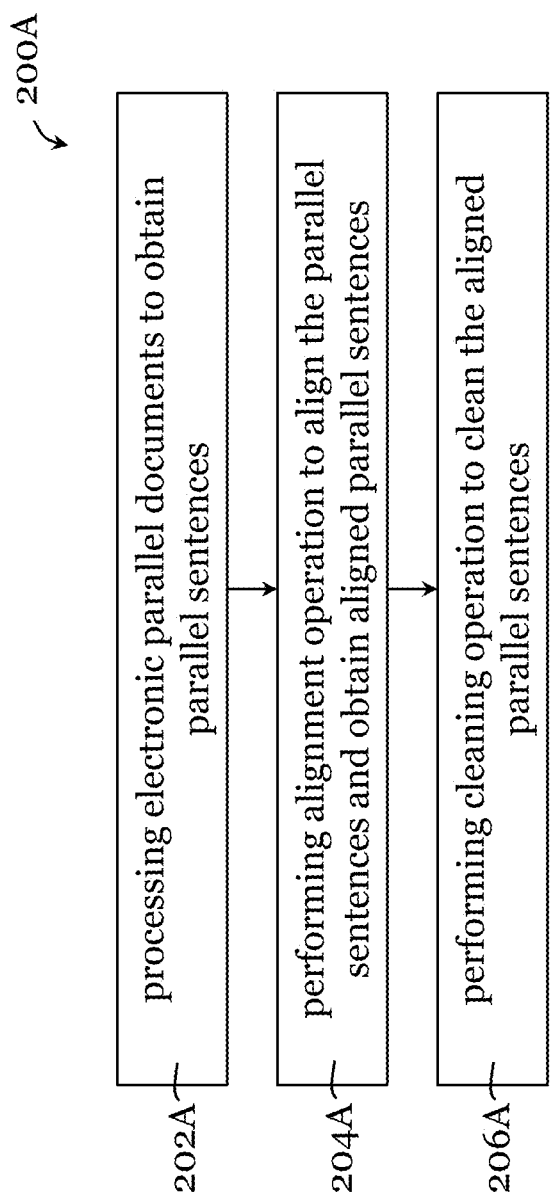
FIG. 2A is a flowchart illustrating a computer-implemented method for processing electronic documents to obtain aligned parallel sentences in one embodiment of the invention.

FIG. 2A illustrates a computer-implemented method 200A for processing electronic documents to obtain aligned parallel sentences in one embodiment of the invention. The method 200A may be implemented as step 102 of the method 100 in FIG. 1. Method 200A begins in step 202A, in which the electronic parallel documents are processed to obtain parallel sentences. The electronic parallel documents are parallel documents (i.e., documents that are translation, preferably formal and recognized translation, of one another) in electronic form. The electronic parallel documents may be obtained from reliable sources or databases for quality control. The electronic parallel documents are preferably documents in the same area, field, or context (e.g., legal) such that the natural language translation model may be specifically adapted for translating a particular area, field (legal), or context or closely related areas, fields, or contexts. The processing of the electronic parallel documents to obtain parallel sentences may involve manual (requires user intervention) or automatic (does not require user intervention) processing. For example, the processing of the electronic documents may involve manipulating (e.g., editing) text in the electronic parallel documents.

After the parallel sentences are obtained in step 202A, in step 204A, an alignment operation is performed to align the parallel sentences and obtain aligned parallel sentences. The alignment operation may include matching sentences in the first natural language with corresponding translation of the sentences in the second natural language. The alignment operation may not include spatial aligning the text.

The aligned parallel sentences include sentences in the first natural language aligned with (i.e., correspond to, or matched with) a corresponding translation of the sentences in the second natural language.

Then, in step 206A, a cleaning operation is performed to clean the aligned parallel sentences. The cleaning operation may include removing some text and/or punctuations (that need not be trained for translation) from the aligned parallel sentences. Step 206A may provide over 10,000, over 20,000, or over 50,000 pairs of aligned parallel sentences, each of the aligned parallel sentences may be formed by 8 to 50 words in one example and other number of words in other examples.

The aligned parallel sentences obtained from step 206A can be used to form training data or training set for training a natural language translation model, such as that as described with respect to FIG. 1.

Figure 2B:
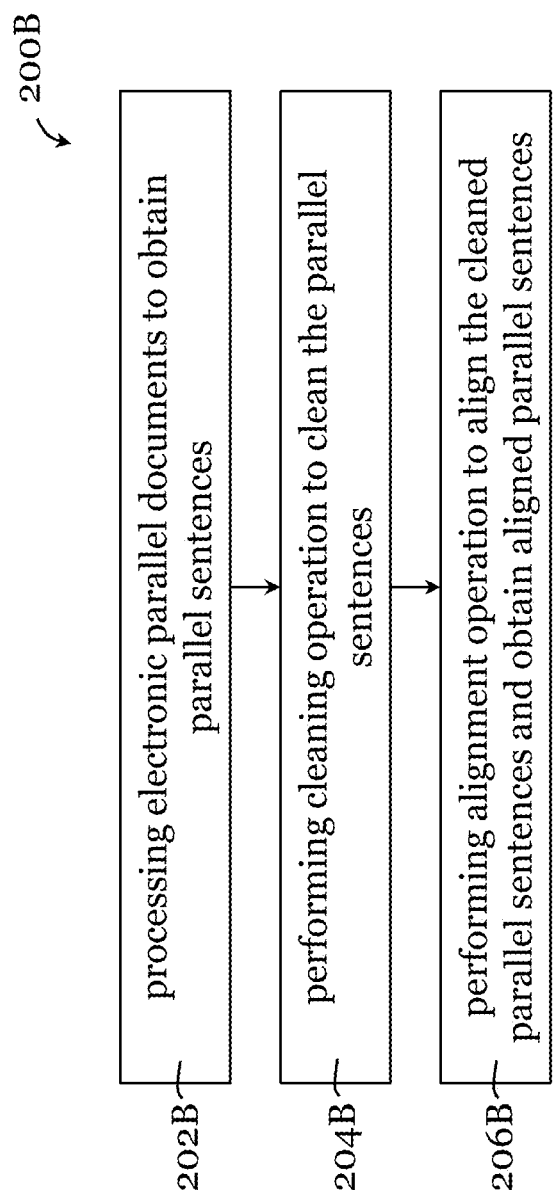
FIG. 2B is a flowchart illustrating a computer-implemented method for processing electronic documents to obtain aligned parallel sentences in one embodiment of the invention.

FIG. 2B illustrates a computer-implemented method 200B for processing electronic documents to obtain aligned parallel sentences in one embodiment of the invention. The method 200B may be implemented as step 102 of the method 100 in FIG. 1. The method 200B in FIG. 2B the same as the method 200A in FIG. 2A, except that the order of the cleaning operation and the alignment operation is swapped. In method 200B, the cleaning operation in step 204B is performed on the parallel sentences obtained from step 202B, and the alignment operation in step 206B is performed on the cleaned parallel sentences obtained from step 204B.

The aligned parallel sentences obtained from step 206B can be used to form training data or training set for training a natural language translation model, such as that as described with respect to FIG. 1.

Figure 3:
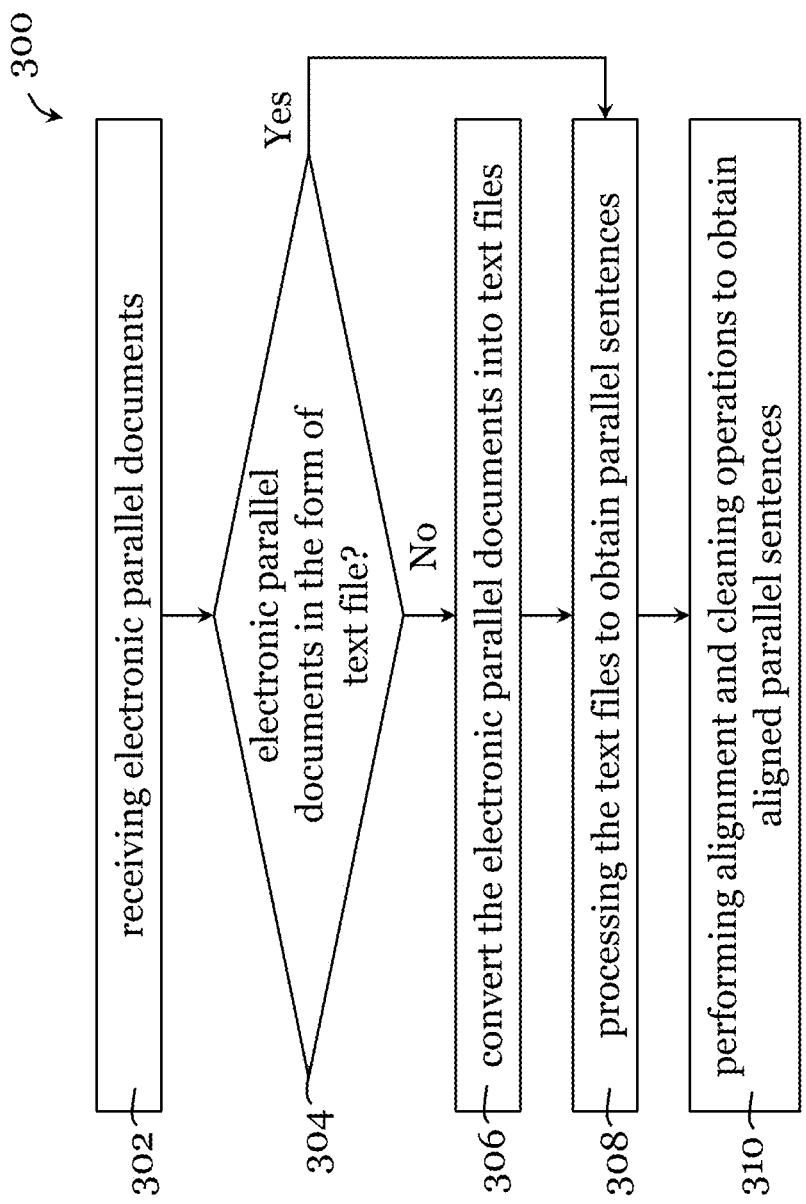
FIG. 3 is a flowchart illustrating a computer-implemented method for processing electronic documents to obtain aligned parallel sentences in one embodiment of the invention.

FIG. 3 illustrates a computer-implemented method 300 for processing electronic documents to obtain aligned parallel sentences in one embodiment of the invention. The method 300 may be implemented as step 102 of the method 100 in FIG. 1.

The method 300 begins in step 302, in which the electronic parallel documents are received or retrieved, e.g., from one or more databases. After step 302, in step 304, the method 300 determines whether the electronic parallel documents are in the form of text files (e.g., Word files, TXT files). In one example, step 304 determines whether the electronic parallel documents are in the form of plain text files (e.g., .TXT files). The determination may be performed manually, or automatically by a computer program.

If, in step 304, it is determined that the electronic parallel documents are not in the form of text files, then the method proceeds to step 306, in which the electronic parallel documents are converted into text file, e.g., manually or using a file formal conversion computer program. Then, after the conversion in step 306, the method proceeds to steps 308 and 310, in which the text files are processed to obtain parallel sentences and alignment and cleaning operations are performed to obtain aligned parallel sentences.

If, in step 304, it is determined that the electronic parallel documents are in the form of text files, then the method proceeds to steps 308 and 310, in which the text files are processed to obtain parallel sentences and alignment and cleaning operations are performed to obtain aligned parallel sentences.

The processing in steps 308 and 310 may include steps 202A-206A of method 200A or steps 202B-206B of method 200B. For brevity, the details of these steps are not repeated here.

The aligned parallel sentences obtained from step 310 can be used to form training data or training set for training a natural language translation model, such as that as described with respect to FIG. 1.

Figure 4:
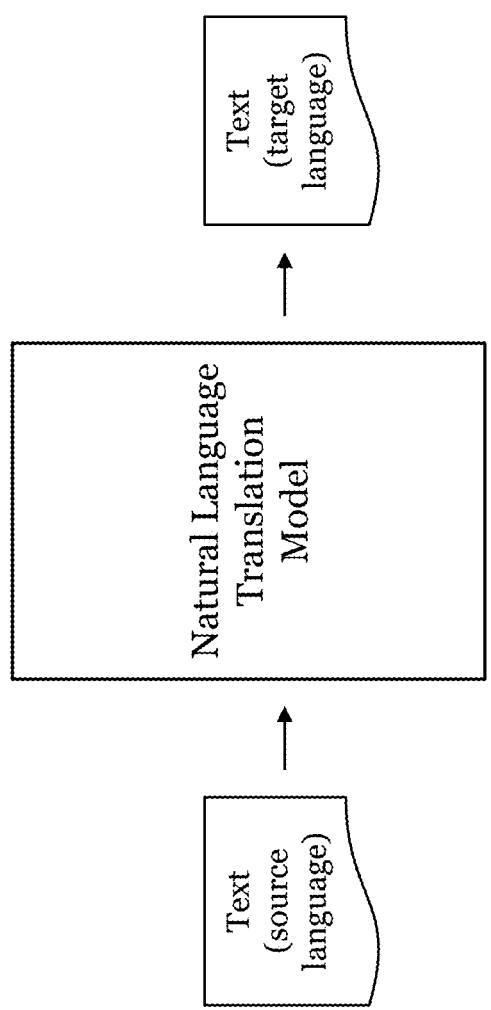
FIG. 4 is a schematic diagram of natural language translation in one embodiment of the invention.

FIG. 4 illustrates an operation of natural language translation in one embodiment of the invention. In operation, text in source language is provided to a natural language translation model, such as a natural language translation model trained using any of the methods in FIGS. 1 to 3. The natural language translation model processes the text in the source language and provides translated text in the target language. The text in source language provided to the natural language translation model may be extracted or obtained from an electronic file containing the text in the first language. The text in target language may be provided as an electronic file containing the text in the second language for download, transfer, and/or view. In some embodiments, a user interface may be provided to facilitate the operation of the natural language translation. The user interface may include a display for displaying the text in the first language and the text in the second language, e.g., side-by-side. In some embodiments, the user interface is provided as part of an electronic system. The electronic system may be an online session system, such as an online dispute resolution system (e.g., an arbitration or mediation system that facilitates online arbitration or mediation).

Figure 5:
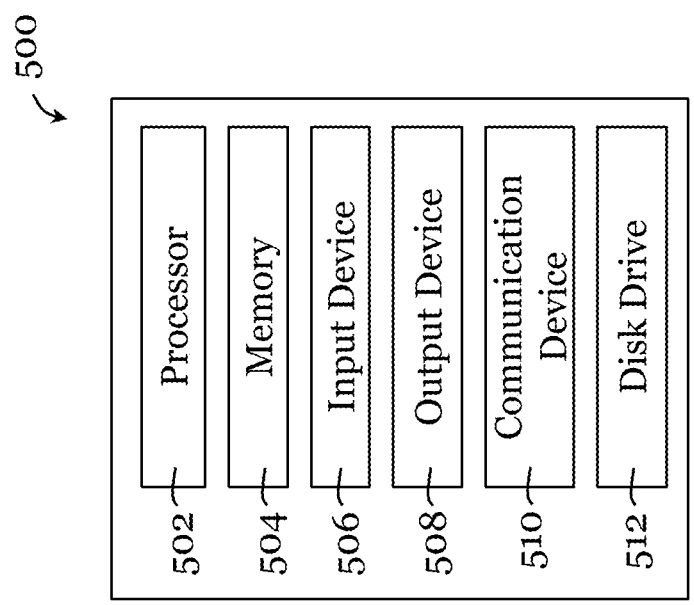
FIG. 5 is a block diagram of an information handling system arranged to perform at least part of, or all of, the computer-implemented method embodiments in one embodiment of the invention.

FIG. 5 is a block diagram of an information handling system 500 arranged to perform at least part of the computer-implemented method embodiments in one embodiment of the invention. For example, the information handling system 500 may be used to perform part of or all of the methods and/or operations in FIGS. 1 to 4. The information handling system 500 may be a generic information handling system or may be a dedicated information handling system.

As shown in FIG. 5, the information handling system 500 generally comprises suitable components necessary to receive, store, and execute appropriate computer instructions, commands, or codes. The main components of the information handling system 500 are a processor 502 and a memory (storage) 504. The processor 502 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory 504 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory 504. One or more natural language processing models and/or one or more natural language translation models may be stored in the memory 504.

Optionally, the information handling system 500 further includes one or more input devices 506. Examples of such input device 506 include one or more of: keyboard, mouse, stylus, image scanner, microphone, tactile/touch input device (e.g., touch sensitive screen), image/video input device (e.g., camera), etc. The one or more input devices 506 may be arranged to receive the text in source language.

Optionally, the information handling system 500 further includes one or more output devices 508. Examples of such output device 508 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive. The one or more output devices 508may be arranged to output the text in target language.

The information handling system 500 may further include one or more disk drives 512 which may encompass one or more of: solid state drive, hard disk drive, optical drive, flash drive, magnetic tape drive, etc. A suitable operating system may be installed in the information handling system 500, e.g., on the disk drive 512 or in the memory 504. The memory 504 and the disk drive 512 may be operated by the processor 502.

Optionally, the information handling system 500 also includes a communication device 510 for establishing one or more communication links (not shown) with one or more other computing devices such as servers, personal computers, terminals, tablets, phones, watches, or wireless or handheld computing devices. The communication device 510 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In some embodiments, the processor 502, the memory 504, and optionally the input device(s) 506, the output device(s) 508, the communication device 510 and the disk drives 512 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. The information handling system 500 may be implemented on a single apparatus or distributed across multiple apparatuses.

A person skilled in the art would appreciate that the information handling system 500 shown in FIG. 5 is exemplary and that the information handling system 500 can have different configurations (e.g., additional components, fewer components, etc.) in other embodiments.

One exemplary implementation of the invention is now presented. It should be noted that this implementation is exemplary and is included to facilitate understanding of how the invention could be implemented in one possibility.

In this example, an online arbitration/mediation cloud services platform is arranged to incorporate an artificial intelligence online neural machine translation service. The neural machine translation service allows a user to translate text files from one language into another language. The neural machine translation service includes a translation model (a model of well-defined translation data) that translates from source language to target language (and vice versa). The following description in this example concerns training of the translation model for use in a specific field (e.g., legal field).

In this example, the online arbitration/mediation cloud services platform is an online dispute resolution platform that allows web user to perform mediation, arbitration and negotiation. The platform provides an artificial intelligence based machine translation service adapted for translating legal documents (e.g., text files) from one language to another. In this example, for the translated text to more closely resemble human translation, a neural machine translation is used. Neural machine translation uses a translation model to translate text file. The translation model contains numerous translation words, in multiple pairs of parallel sentences on the source and target languages (similar with a dictionary, in particular a legal terms/phrase dictionary).

The building of the translation model involves data pre-processing, model training and tuning, etc., which affects quality of translation provided by the model.

One aspect of this example concerns training materials sourcing and pre-processing.

Parallel documents are the documents that are multilingual, e.g., bilingual—one language is the formal and recognized translation of the other language. Preferably, documents that qualify as training material (for use in training the natural language translation model) has this characteristic.

In this implementation the translation system is for use in translating documents in the area of trade, business, or legal, which commonly include legal terms and phrases. Therefore, the content of the parallel documents or the parallel sentences has to be related to arbitration, mediation, trade, online dispute resolution, or other legal aspects. When selecting documents for use as training materials, in this example, the focus is on documents relate to legal, arbitration, mediation, dispute resolution (online dispute resolution), trade, etc. In this example, preferred documents are those with quality translation, accurate and well-structured sentences, accurately/correctly used words, terms and/or phrases, legal words/terms/phrases consistency, and are legal, trade, and/or online dispute resolution related. Ideally these parallel documents should be obtained from reliable sources. In this example, the parallel documents are obtained from data sources such as the United Nation, CLOUT cases (Case Law), International Chamber of Commerce of different Spanish speaking countries, London, Stockholm and the international one, Arbitration center in Mexico, International Centre of Settlement of Investment Disputes, Chile Arbitration and Mediation Centre, Hong Kong International Arbitration Centre, and the World Trade Organization. In one example, award of arbitration, arbitration reports, and trade documents from WTO may be used. In this example, documents from these different sources are used for training the translation model.

In this example, 25,000 to 30,000 parallel sentences are obtained and employed for training, tuning and testing of the translation model.

The parallel documents obtained from the sources along with their approximate number of sentences are recorded for record keeping. The parallel documents or electronic files are named according to a predetermined format. In this example, for English language text files, the file name ends with "_EN.txt", for Spanish language text files, the file name ends with "_SP.txt", Another aspect of this example concerns aligned parallel corpora preparation.

In this example, the parallel documents suitable for training are identified and obtained (or downloaded). In this example, the system for processing the text in parallel documents is arranged to accept text file (.txt) format, UTF-8 encoded. Other systems used in other examples may have other specifications. Appropriate file conversion is thus required if the obtained parallel documents are not already in the accepted format.

Then, after the suitable file format is obtained, the parallel documents are processed to obtain aligned parallel sentences. In one example, alignment tools such as WinMerge is used to facilitate aligning, comparing and editing the parallel sentences. The "replace" function in WinMerge may be used to clean the document, e.g., to remove unwanted punctuation or symbols.

Various points should be noted when aligning and cleaning parallel sentences. It is noted that the performance of the translation system may be sensitive to properties of the text, such as: complexity (presence of elements other than text), structural distance (a scale from literal to free translation), amount of noise (text deletions or pre-processing errors) and typological distance between languages. Due to the diversity and noisy nature of web corpora, cleaning the documents will lead to an improvement in the translation performance of the model trained using the parallel sentences obtained from these documents. In this example, alignment refers to the creation of parallel text by assigning a correct English sentence to a corresponding Spanish sentence.

In this example, the model is arranged to translate from English language to Spanish language, for legal related text. In this example, when editing the parallel documents, one or more cleaning operations can be performed. These cleaning operations include:

Delete "(s)" or open parentheses.

Delete all headings, short titles, and table of contents. Only use full sentences.

Delete sentences that contain too many numbers or statistics.

Delete all numberings and bullet points, which may mess up the format/lining.

Delete single words like "and/or" at the end of sentences after a punctuation

Delete all wordings in brackets. Sometimes only one language version is bracketed.

Make sure to find the corresponding sentence in the other language and perform adjustments.

Delete people's name.

Replace semicolon (;) with full stop (for English language).

Adjust the alignment when that happens: E.g. "I like cats, and I like dogs." (English) Vs "I like cats. I like dogs" (Other language). In this case, the neural machine translation model will count one sentence in English, but two sentences in the other language which may cause misalignment.

Delete all full stops that do not end a sentence (E.g., i.e., cap.123).

Delete quotations marks " ", parentheses ( ) brackets [ ].

Delete URLs.

Delete spaces at the beginning of a sentence.

Delete duplicate parallel sentences.

Do not use documents that include too many words in different languages that is not the target language.

Company names and personal names can be retained in some cases.

Create separate sentences when there is colons and semi-colons (:) (;) and different options.

Ensure consistency. For example, if numeral is used to represent number in one language then numeral should also be used to represent the same number in the other language; if written number is used to represent number in one language then written number should also be used to represent the same number in the other language. As another example, terminologies (e.g., legal terms) should be used consistently in different sentences.

In this example, when editing the parallel documents, one or more further cleaning operations can be performed. These further cleaning operations concern English-Spanish language translation, and they include:

Keep the Latin terms in both language

Keep the comas in Spanish language

The translation in Spanish is in a completely different order but the translation is correct. The sentence should be kept in the order that it is translated if it is correct and proper in Spanish/English.

Some Spanish words can be feminine and masculine—keep both versions in some cases.

Keep hyphen in the English language and the translated version in Spanish language Another aspect of this example relates to model building. In this example, the model can be built using the Microsoft® Neural Machine Translation System.

In this System, different categories can be chosen to train the model. In this example, the first trainings are performed in two categories of interest (general and law). This is to understand better how the system perform in these two categories from English to Spanish and vice versa. Noting that the object of this example is to build a system specialized in legal translation.

In this example, the training material can be uploaded to the System in two ways: (1) consolidating all data, and (2) file by file. In one example, the documents are split among law cases and mixed documents (UN, WTO, etc.). After aligning all documents, all the training materials are consolidated in two large documents using WinMerge. After this, the large documents are split into multiple smaller documents each having around 5,000 sentences to facilitate processing. When uploading documents to the System, document type can be chosen.

Next, training, testing, and tuning data are defined. In this example, the testing and tuning data is selected manually, however, in another example, they can be selected by a Custom Translator function in the System.

Training, testing, and tuning data are recorded (for recording keeping).

In this example, the training dataset is the base set for building/training the model and can be changed between trainings in order to find the most effective way to improve model translation quality. The training dataset is a dataset of examples used by the system to learn. In this example, the training dataset should contain at least 20,000 parallel sentences. The training dataset should use sources and characteristics mentioned above. In this example, parallel sentences are extracted from the training dataset and used in the test set. This would make the fine tuning after each training easier. In this example, each sentence must be from 8 to 50 words in any dataset (training, tuning or testing datasets).

In this example, the tuning dataset is manually chosen. In this example, the tuning dataset does not need more than 2500 parallel sentences, but it should be chosen carefully as it would help the translation system provide translations closest to the sentences provided in this set, hence has a significant impact in the quality of the translations. In this example, the tuning dataset should include meaningful sentences and similar to the ones that intended to be translated by the system or model. In this example, the tuning dataset should contain sentences that each has a length from 8 to 50 words. This more closely resembles real-life legal documents and would better prepare the system for deployment/use.

In this example, the testing dataset includes content or any term that is desirable for testing the system. In this example, the test set is an extract of the training set, so that it is easier to experiment and fine tune the training dataset. In this example, the testing dataset should include the legal, online dispute resolution and Trade terms that are considered to be important for the system or model. In this example, the testing dataset contains no more than 2,500 parallel sentences and is manually chosen to compare between-training improvement. In this example, the testing dataset contains sentences each having a length of 8 to 50 words. In this example, the testing dataset contains sentences are well aligned sentences with clear meaning, structure and quality translation.

After uploading the documents, the System determines whether the documents are aligned. If misalignment is detected then correction can be performed.

To deploy a translation model, the model has to meet a criteria that is established through the process. In one example, the model for deployment has the highest score among all models.

Another aspect in this example concerns model review.

The training time of the model will vary and depend of the quantity of data. A training of the model can fail or succeed. A training can fail while it is training or while the data is being processed. The likely reasons for failure are that too many trainings are run simultaneously or the computer running the trainings are shut down during training.

After the trainings succeeded, the System provides a BLEU (Bilingual Evaluation Understudy) score and a baseline BLEU score. In this example, the outcome (e.g., sentence count, BLEU score, status and system test results) of each training is checked. Sentence count refers to the number of sentences used. Here after training it is possible to download the data that is used for training. Downloading and comparing it with the original data using tools such as WinMerge allow us to find mistakes and misalignments.

In this example, the training output is checked in order to identify mistakes and misalignments. These mistakes and misalignments can be corrected to improve the translation system and produce a more experienced and higher quality neural machine translation model. In this example, the testing dataset can be checked by clicking "system test results" in the System. The testing dataset in each training is read to identify the most common translation issues. After identifying the most common translation issues, the testing data is read to identify how common these issues are and to determine whether they affect the quality in the translation. The mistakes observed are compared against the baseline (e.g., translation using Bing® translator engine) to see if the issues also occur in the baseline. If the issues also occur in the baseline, it is interpreted as a natural issue. If not, it means that the issue is in the model training. Additionally, possible solutions to address the mistake and misalignments are identified and enforced. These issues usually relate to parallel sentence editing or quantity, but is sometimes unknown.

The most common translation issues identified in this example include: grammatical error, punctuation error, inconsistent use of terminology, faulty sentence structure, wrong word order, untranslated word, mistranslated word, improper repetition of word, phrase, statement, or article, wrong use of word, and literal translation out of context.

In this example, the training data is modified between trainings, to improve the model training and hence the model. In this example, the following operations are performed before reaching the desired level for English—Spanish translation:

Increasing the number of parallel sentences in every training with the aim of creating a translation system with a broader language and less literal translations.

The training data set edited between trainings. This involves misalignments, translation issues, consistency in legal terms, Latin idioms & acronyms and cleaning punctuation & numbering.

After every training, the data set is adjusted based on the translation issues found.

The testing and tuning data sets are manually selected and are mostly kept constant, in order to check at ease and more accurate the progress of the trainings.

The testing dataset is edited once because of the lack of some legal terms and acronyms that are important.

Another aspect of this example concerns model quality assessment, e.g., how the output quality of the machine translation program evaluated, the criteria and method used and established for assess the quality of the translations.

In this example, a marking scheme is devised. The quality assessment consisted in evaluating 5 criteria with a total score of 100%. Each criterion score range 0-20% of the total. This is a human-oriented machine translation quality scheme as BLEU cannot access quality. The first four criteria are to be assessed by human expert in both languages:

1. Correctness in sentence structure: The notion that the sentence owns a syntactic structure that meets grammar standards and rules.
2. Correctness in terms and words used: The extent of which the translation used the right words, terms, or tense.
3. Accuracy in meaning: The extent of which the sentence is correct or precise. Reflect the meaning correctly.
4. Quality in translation.
5. Adjusted BLEU score: (Score X of the current training/Max Score Y of all tests)*20. Its purpose is to cater for multiple trained models.

In this example, the BLEU score is an algorithm that provides a basic quality metric. It measures the correspondence between a machine translation output and a human translation. Usually, the closer a machine translation is to a professional human translation, the better it is. The adjusted BLEU score intends to cover the continuous process of the trainings as it requires several trainings through the process. It is a criterion but not the only criterion in quality assessment. Human quality assessment should additionally or alternatively be performed to obtain a better evaluation. An exemplary scale is used in this example to judge the quality of the translations. The criteria to deploy a model is that it has to score over 80. A score of 80-100=Excellent; a score of 60-80=Good; a score of 50-60=Acceptable; a score of <50=Fail. The score is obtained based on the above criteria.

In this example, the model is tested at an internal and external level after being selected and deployed. After the testing several issues are identified: (1) the model could not properly handle rare words (which might be translated as the same rare word or an invented word); (2) Lengthy sentences (>50 words) sometimes lead to failed translation. After identifying these issues, the model is trained again by adding 5,000 parallel shorter sentences related with online dispute resolution. After this training a notable decease in untranslated words, rare translations, wrong word order and some legal terms choices are observed.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Feature(s) in one embodiment may be selectively combined with feature(s) in another embodiment to form new embodiment(s). For example, the natural language translation model can be but need not be a neural-machine translation model or network. The natural language translation model can be arranged to translate from one or more natural language(s) to one or more other natural language(s), or between multiple (two or more) natural languages. The source language can be but need not be English; the target language can be but need not be Spanish.

The invention claimed is:

1. A computer-implemented method for training a natural language translation model, comprising:

processing one or more sets of electronic parallel documents to obtain a plurality of aligned parallel sentences;

creating a first training set comprising a subset of the plurality of aligned parallel sentences and relating to a plurality of categories of interest;

creating a testing set, wherein the testing set is an extract of the first training set and relates to one or more of the plurality of categories of interest;

training the natural language translation model in a first stage using the first training set;

modifying the first training set based on translation errors detected after the first stage of training using the testing set;

creating a second training set based on the modified first training set and at least some of the plurality of aligned parallel sentences that are not in the first training set and relate to a category from said one or more of the plurality of categories of interest;

training the natural language translation model in a second stage using the second training set so as to improve translation performance of the natural language translation model;

modifying the second training set based on translation errors detected after the second stage of training;

creating a third training set based on the modified second training set and at least some of the plurality of aligned parallel sentences not in the first and second training sets; and training the natural language translation model in a third stage using the third training set so as to further improve translation performance of the natural language translation model.

2. The computer-implemented method of claim 1, wherein the processing of one or more sets of electronic parallel documents comprises:

processing the one or more sets of electronic parallel documents to obtain a plurality of parallel sentences; and performing an alignment operation to align the plurality of parallel sentences so as to form the plurality of aligned parallel sentences.

3. The computer-implemented method of claim 2, wherein the processing of the one or more sets of electronic parallel documents comprises:

if the one or more sets of electronic parallel documents are not in a form of text files, converting the one or more sets of electronic parallel documents into text files, preferably plain text files; and processing the text files to obtain the plurality of parallel sentences.

4. The computer-implemented method of claim 2, wherein processing the one or more sets of electronic parallel documents comprises:

performing a cleaning operation to clean the plurality of parallel sentences or the plurality of aligned parallel sentences.

5. The computer-implemented method of claim 4, wherein the cleaning operation comprises removing some text and/or punctuations from the plurality of parallel sentences or the plurality of aligned parallel sentences.

6. The computer-implemented method of claim 1, wherein the translation errors comprise one or more of: grammatical error, punctuation error, inconsistent use of terminology, faulty sentence structure, wrong word order, untranslated word, mistranslated word, improper repetition of word, phrase, statement, or article, wrong use of word, and literal translation out of context.

7. The computer-implemented method of claim 6, wherein the modifying of the first training set based on translation errors comprises: removing and/or editing some text and/or punctuations in the subset of the plurality of aligned parallel sentences.

8. The computer-implemented method of claim 1, wherein the natural language translation model comprises a neural-machine translation model or network.

9. The computer-implemented method of claim 1, wherein the natural language translation model is arranged for translation from a first natural language to a second natural language, wherein each of the one or more sets of electronic parallel documents are in the first natural language and the second natural language, and wherein each of the plurality of aligned parallel sentences are in the first natural language and the second natural language.

10. The computer-implemented method of claim 9, wherein the natural language translation model is arranged for translation between the first natural language and the second natural language.

11. The computer-implemented method of claim 9, wherein the first natural language is English language and the second natural language is Spanish language.

12. The computer-implemented method of claim 1, wherein each of the plurality of aligned parallel sentences of the first training set contains 8 to 50 words, and each of the plurality of aligned parallel sentences of the second training set contains 8 to 50 words.

13. The computer-implemented method of claim 1, wherein the number of aligned parallel sentences used in the training in the second stage is more than the number of aligned parallel sentences used in the training in the first stage.

14. The computer-implemented method of claim 1,
wherein the one or more sets of electronic parallel documents comprise electronic documents of the same field or context; and
wherein the natural language translation model is a field or context specific natural language translation model.

15. The computer-implemented method of claim 14, wherein the field or context is a legal field or legal context.

16. The computer-implemented method of claim 1, further comprising:
collecting, e.g., retrieving, the one or more sets of electronic parallel documents from one or more databases.

17. A natural language translation model trained using or obtained from the computer-implemented method of claim 1.

18. A non-transitory computer-readable medium comprising the natural language translation model of claim 17.

19. A computer-implemented method of natural language translation, comprising:
receiving text in a first language;
processing the received text using the natural language translation model of claim 17; and
outputting text in a second language based on the processing, the text in the second language being a translation of the text in the first language.

20. An electronic system, comprising:
one or more processors arranged to:
receive text in a first language;
process the received text using the natural language translation model of claim 17; and
output text in a second language based on the processing, the text in the second language being a translation of the text in the first language.

21. The electronic system of claim 20, further comprises:
a display operably connected with the one or more processors for displaying the text in the first language and the text in the second language.

22. The electronic system of claim 20, wherein the electronic system is an online session system, such as an online dispute resolution system.

* * * * *